US012591846B2

(12) United States Patent
     Kim et al.

(10) Patent No.: US 12,591,846 B2
(45) Date of Patent:     Mar. 31, 2026

(54) MOBILE FULFILLMENT SYSTEM

(71) Applicants: HYUNDAI MOTOR COMPANY, Seoul (KR); KIA CORPORATION, Seoul (KR)

(72) Inventors: SiWon Kim, Seoul (KR); Won Chol Yeom, Hwaseong-si (KR); Wonseok Choi, Seoul (KR); Jungu Lee, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 283 days.

(21) Appl. No.: 17/883,714

(22) Filed: Aug. 9, 2022

(65) Prior Publication Data

US 2024/0054446 A1     Feb. 15, 2024

(51) Int. Cl.
| | |
|---|---|
| *G06Q 10/087* | (2023.01) |
| *B60P 1/40* | (2006.01) |
| *B60P 1/64* | (2006.01) |
| *B60P 3/20* | (2006.01) |
| *G06Q 10/0832* | (2023.01) |
| *B60J 5/06* | (2006.01) |
| *B60J 5/10* | (2006.01) |

(52) U.S. Cl.
CPC .............. *G06Q 10/087* (2013.01); *B60P 1/40* (2013.01); *B60P 1/6445* (2013.01); *B60P 3/20* (2013.01); *G06Q 10/0832* (2013.01); *B60J 5/062* (2013.01); *B60J 5/108* (2013.01)

(58) Field of Classification Search
CPC .... B60P 3/007; B60P 1/38; B60P 3/20; B60P 224/901; B60P 224/40; B60P 224/31; B60P 1/40; B60P 1/6409; G06Q 10/087; G06Q 10/0832; B60J 5/062; B60J 5/108
USPC ........................................................ 705/28
See application file for complete search history.

(56) References Cited

U.S. PATENT DOCUMENTS

| | | | |
|---|---|---|---|
| 7,524,157 | B2 | 4/2009 | Hurler |
| 8,523,508 | B2 | 9/2013 | Hurler |
| 10,317,119 | B2 | 6/2019 | Zou |
| 10,776,750 | B2 | 9/2020 | Lindbo et al. |
| 10,981,724 | B2 | 4/2021 | Lert, Jr. et al. |
| 11,151,507 | B2 | 10/2021 | Kang et al. |
| 2006/0013678 | A1 | 1/2006 | Hurler |
| 2009/0208315 | A1 | 8/2009 | Hurler |

(Continued)

FOREIGN PATENT DOCUMENTS

| | | | |
|---|---|---|---|
| CN | 103029979 A | * | 4/2013 |
| JP | 3495090 B2 | | 2/2004 |

(Continued)

*Primary Examiner* — Luna Champagne
(74) *Attorney, Agent, or Firm* — Lempia Summerfield Katz LLC

(57)     ABSTRACT

A mobile fulfillment system includes a shipper system that collects and manages customer information and order data input from customers; a fulfillment platform that receives the customer information and order data from the shipper system and controls vehicle control and dispatch accordingly; and a mobile fulfillment center that includes a plurality of vehicles dispatched from the fulfillment platform and delivers products to customers and monitors delivery status according to the customer information and order data.

10 Claims, 16 Drawing Sheets

(56)  References Cited

U.S. PATENT DOCUMENTS

2011/0046775 A1 *  2/2011  Bailey ...................... B07C 3/02
                                                    700/224
2017/0323250 A1    11/2017  Lindbo et al.
2018/0025318 A1 *  1/2018  Baggott ............... G06Q 10/047
                                                    705/334
2018/0058739 A1    3/2018  Zou
2018/0215543 A1    8/2018  Lert, Jr. et al.
2019/0143872 A1 *  5/2019  Gil ...................... B65G 1/0407
                                                    211/86.01
2020/0302374 A1    9/2020  Kang et al.
2021/0094506 A1 *  4/2021  Baker .................. B60R 25/241
2021/0237975 A1    8/2021  Lert, Jr. et al.
2021/0406811 A1   12/2021  Kang et al.
2022/0112040 A1 *  4/2022  Hartmann ............. B65G 47/90

FOREIGN PATENT DOCUMENTS

JP         2017534990 A    11/2017
JP         2018047887 A     3/2018
JP         2020506137 A     2/2020
KR        20050086654 A     8/2005
KR          101675920 B1   11/2016
KR        20180023173 A     3/2018
KR        20200111091 A     9/2020
WO       WO-0242012 A1 *   5/2002   ............. B07C 3/08
WO        2018039423 A1     3/2018

* cited by examiner

FIG. 3

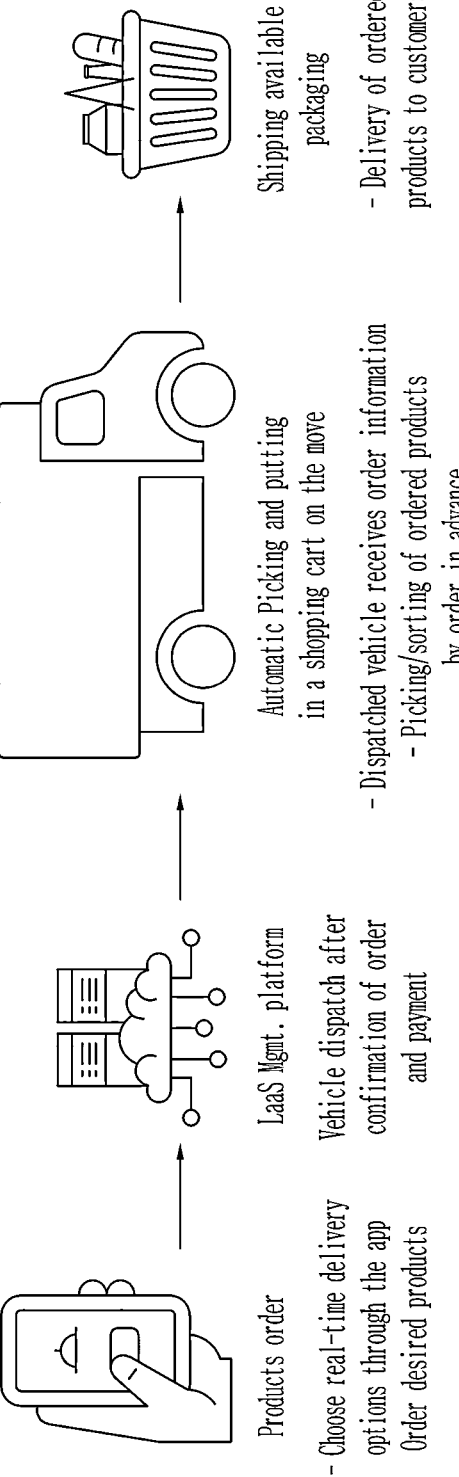

Products order

- Choose real-time delivery options through the app
Order desired products

LaaS Mgmt. platform

Vehicle dispatch after confirmation of order and payment

Automatic Picking and putting in a shopping cart on the move

- Dispatched vehicle receives order information
- Picking/sorting of ordered products by order in advance Shipping available packaging

- Delivery of ordered products to customers

<side>                    <front>

MOBILE FULFILLMENT SYSTEM

BACKGROUND

(a) Field of the Disclosure

The present disclosure relates to a mobile fulfillment system. More particularly, the present disclosure relates to a mobile fulfillment system capable of handling items loading, ordering, moving, picking, and packaging in-vehicle to implement an immediate delivery service.

(b) Description of the Related Art

The existing fulfillment center is responsible for processing customer orders using the online store in 3rd party logistics (3PL).

These existing fulfillment centers generally require a large space to store physical inventory and are located outside the city center. Items are sorted at the city center and delivered to individual delivery addresses.

The functions of the fulfillment center largely comprises inventory management, order processing, item picking, and item packaging and delivery.

According to such an existing fulfillment center, it takes at least 3 hours or more from ordering an item to delivery, and in fact, it takes about 8 to 12 hours.

The above information disclosed in this Background section is only for enhancement of understanding of the background of the disclosure, and therefore it may contain information that does not form the prior art that is already known to a person of ordinary skill in the art.

SUMMARY

The present disclosure provides a mobile fulfillment system that can reduce delivery time by processing orders, moving, picking, and packing in-vehicle at the same time. To this end, the mobile fulfillment system may build a mobile fulfillment center using a vehicle such as a delivery truck or a light truck from an existing fixed-scale logistics center and implement an immediate delivery service within a limited delivery radius.

The mobile fulfillment system according to an embodiment of the present disclosure implements an order-immediate delivery service by utilizing a mobile fulfillment center based on a vehicle, such as a delivery truck or a light truck. Loading, ordering, moving, picking, and packaging items can be processed in a vehicle. It is a real-time food delivery solution.

In addition, the fulfillment center according to an embodiment of the present disclosure utilizes a low-floor or high-floor vehicle-based refrigerator and freezer EV vehicle.

A mobile fulfillment system according to an embodiment of the present disclosure includes a shipper system that collects and manages customer information and order data input from customers. The mobile fulfillment system also includes a fulfillment platform that receives the customer information and order data from the shipper system and controls vehicle control and dispatch accordingly. The mobile fulfillment system also includes a mobile fulfillment center that includes a plurality of vehicles dispatched from the fulfillment platform and delivers items to customers and monitors delivery status according to the customer information and order data.

The shipper system may receive the customer information and order data input through an application (app) and may transmit the order data and payment information to the fulfillment platform.

The fulfillment platform may perform vehicle dispatch after checking the order data and payment information and may perform inventory management for each dispatched vehicle.

The mobile fulfillment center may transfer the order data transmitted from the fulfillment platform to the dispatched vehicle.

The plurality of vehicles may include a low-floor combined refrigeration box vehicle.

The plurality of vehicles may perform automatic sorting and automatic picking inside while moving to a delivery destination by using the order data transmitted from the fulfillment platform.

A plurality of roll containers may be provided inside the plurality of vehicles, and each stage of the roll containers may be formed of a conveyor belt.

At the front end of the conveyor belt of each stage of the roll container, a picking conveyor belt of which the vertical height is adjusted and disposed in a direction perpendicular to the conveyor belt of each stage of the roll container may be provided.

The plurality of vehicles may be provided with double-door swing doors on both sides and rear sides, respectively.

The plurality of vehicles may be provided with a plurality of three-stage roll containers, respectively, in the item storage compartments on both sides and the rear side.

The roll container may be provided with a wheel and a wheel fixing device at the lower end.

A protrusion may be provided at the edge of the front end of each end of the roll container, and the inclination of each end of the roll container may be adjusted.

In the plurality of vehicles, the item storage compartments on both sides may be provided as a freezer compartment and a refrigerator compartment, respectively, and the item storage compartments on the rear side may be provided as a refrigerator compartment.

The plurality of vehicles may be provided with a double-door swing door on the rear side, and a short-door type swing door on the rear side of the passenger seat.

In the plurality of vehicles, a plurality of four-stage roll containers may be provided in the item storage compartment, and one four-stage roll container may be provided in the rear space of the passenger seat side.

In the plurality of vehicles, the item storage compartment may be provided as a refrigerator compartment, and the rear space of the passenger seat side may be provided as a freezer compartment.

The plurality of vehicles may be provided with a transparent sliding door on one side, a double-door type swing door on the rear side, and a rolling door inside the item storage compartment.

The transparent sliding door may be displayed with a display and lighting.

In the plurality of vehicles, a two-stage first shelf may be provided in one side of the item storage compartment, and a four-stage second shelf may be provided in the rear space of the item storage compartment and the passenger seat side of the rear side.

In the plurality of vehicles, one side and rear side item storage compartments may be provided as refrigerator compartments, and the rear space of the passenger seat side may be provided with a freezer compartment.

According to an embodiment of the present disclosure, by building a mobile fulfillment center using a vehicle such as a delivery truck or a light truck from an existing fixed-scale logistics center and by implementing an immediate delivery service within a limited delivery radius, moving, picking, and packing items are handled in-vehicle at the same time as ordering, thereby the delivery time may be shortened.

In addition, it is possible to provide a service that pre-loads major items in the vehicle, and when a customer places an order, orders are processed through the control platform and delivered immediately through vehicle dispatch.

In addition, order and inventory management, sorting, loading, unloading, packaging, and delivery, which were carried out in the existing logistics center, can be carried out in individual units in a vehicle such as a delivery truck or a light truck on a small scale.

BRIEF DESCRIPTION OF THE DRAWINGS

In order that the disclosure may be well understood, there will now be described various forms thereof, given by way of example, reference being made to the accompanying drawings, in which:

FIG. 3 is a view showing a procedure for reducing the time to the automatic picking system by utilizing the vehicle movement time in the mobile fulfillment system according to an embodiment of the present disclosure;

Figure 1:
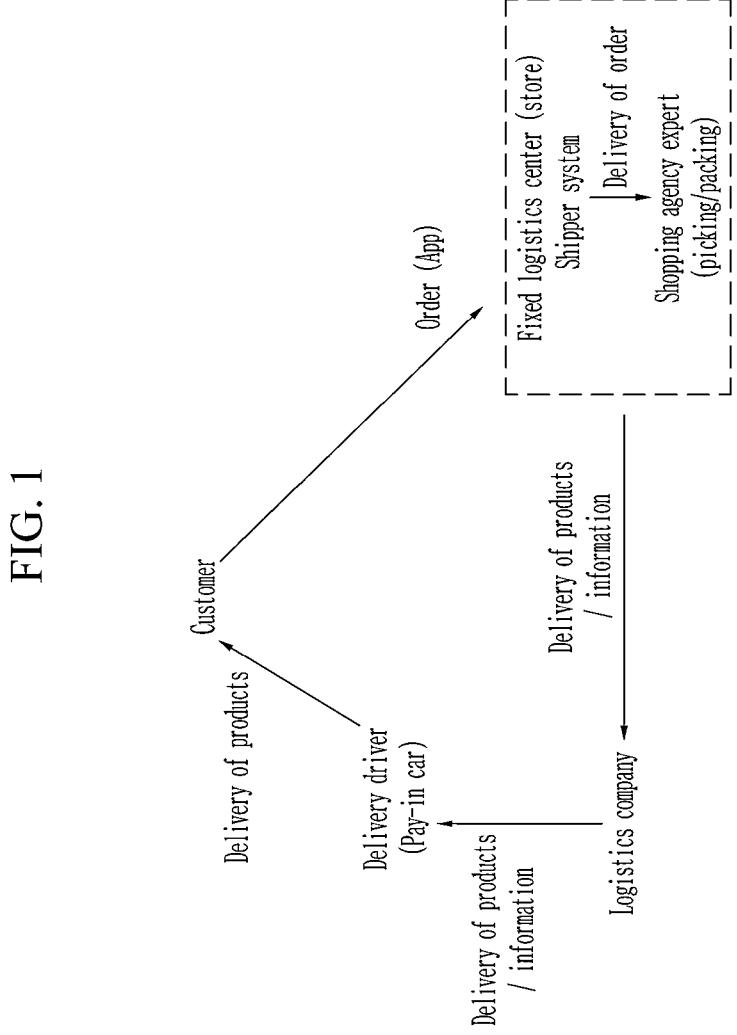
FIG. 1 is a view showing an order and delivery procedure through an existing fixed logistics center.

The drawings described herein are for illustration purposes only and are not intended to limit the scope of the present disclosure in any way.

DETAILED DESCRIPTION

Hereinafter, the present disclosure is described more fully hereinafter with reference to the accompanying drawings, in which embodiments of the disclosure are shown. As those having ordinary skill in the art would realize, the described embodiments may be modified in various different ways, all without departing from the spirit or scope of the present disclosure.

Further, in embodiments, since like reference numerals designate like elements having the same configuration, a first embodiment is representatively described, and in other embodiments, only configurations different from the first embodiment are described.

The drawings are schematic and are not illustrated in accordance with a scale. Relative dimensions and ratios of portions in the drawings are illustrated to be exaggerated or reduced in size for clarity and convenience, and the dimensions are just exemplified and are not limiting. In addition, like structures, elements, or components illustrated in two or more drawings use same reference numerals for showing similar features. It should be understood that when an element such as a layer, film, region, or substrate is referred to as being "on" another element, it can be directly on the other element or intervening elements may also be present.

When a component, device, element, or the like of the present disclosure is described as having a purpose or performing an operation, function, or the like, the component, device, or element should be considered herein as being "configured to" meet that purpose or to perform that operation or function.

The embodiment of the present disclosure shows an embodiment of the present disclosure in detail. As a result, various modifications of the drawings should be expected. Therefore, the embodiment is not limited to a specific aspect of the illustrated region, and the embodiment, for example, includes modifications of an aspect by manufacturing.

Now, a mobile fulfillment system according to an embodiment of the present disclosure is described with reference to attached drawings.

Figure 2:
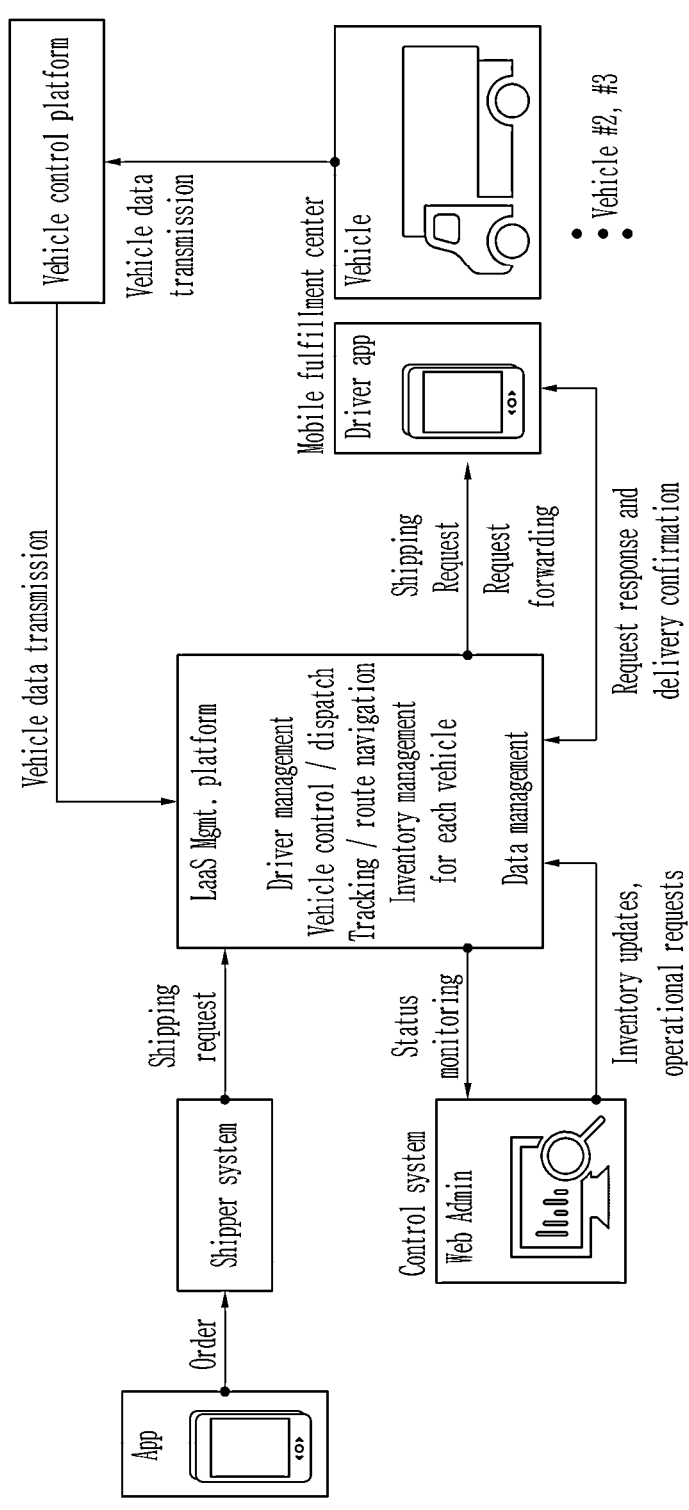
FIG. 2 is a diagram illustrating a real-time delivery procedure using a mobile fulfillment system according to an embodiment of the present disclosure.

FIG. 2 is a diagram illustrating a real-time delivery procedure using a mobile fulfillment system according to an embodiment of the present disclosure. FIG. 3 is a view showing a procedure for reducing the time to the automatic picking system by utilizing the vehicle movement time in the mobile fulfillment system according to an embodiment of the present disclosure.

Referring to FIG. 2, the mobile fulfillment system according to an embodiment of the present disclosure is a real-time delivery solution for fresh food using a mobile micro-fulfillment center based on a vehicle such as a delivery truck or a light truck and includes a shipper system, a fulfillment platform, and a mobile fulfillment center.

The shipper system receives orders from customers (orderers) through applications (apps) of a smartphone, etc. and collects and manages customer and order data.

Customers can select the item they wish to purchase and select a delivery option through the application. For example, the customers may select an option regarding real-time delivery or scheduled delivery, etc. In addition, the customers can enter and store payment information. The control system checks customer information, order information, and payment information, and confirms inventory and an order. After delivery of the items is completed, the customer can input feedback such as delivery evaluation.

The shipper system receives customer information and order data entered through the application and delivers order data and payment information to the fulfillment platform.

The fulfillment platform works with the shipper system to receive customer information and order data to control vehicle control and dispatch accordingly.

The fulfillment platform may perform vehicle dispatch after checking order data and payment information and may perform inventory management of items for each dispatched vehicle.

The fulfillment platform can allocate the logistics vehicle of the mobile fulfillment center based on the location of the orderer and the stock information of the vehicle. The fulfillment platform may include a platform configured as a server, a mobile fulfillment system, a routing, and a vehicle-side communication system. The vehicle-side communication system may include a terminal installed on the vehicle side, a terminal possessed by the driver, and a shipper system-side terminal.

Meanwhile, the fulfillment platform can reflect the delivery status and update inventory for each vehicle. In addition, the fulfillment platform can also recommend an optimal waiting area for logistics vehicles in consideration of the existing statistical-based service demand forecast and real-time traffic conditions.

In addition, the fulfillment platform may check customer information, stock status, and payment details and may notify the orderer of the delivery reservation after confirming the order.

The fulfillment platform can select and reassign the optimal vehicle in consideration of real-time traffic information, the location of the current delivery vehicle, and the driver's status.

The fulfillment platform may perform vehicle dispatch by collecting real-time delivery requests and scheduled delivery requests. The fulfillment platform collects reserved order and delivery requests and real-time order and delivery requests to dispatch appropriate vehicles. In this case, the appropriate vehicle dispatch may be determined according to the delivery request time, the distance from the delivery destination, and the availability of stock available for delivery in the vehicle.

The fulfillment platform can check whether a nearby vehicle is in stock when there is insufficient stock in the vehicle and can guide the tangential location in consideration of the arrival time.

In addition, the fulfillment platform can deliver to the control system when the driver requests delivery impossible due to loss of items or poor condition.

The fulfillment platform can deliver information on the contents of the item to be packaged to the driver, and the driver can be used to pick the item and add it to the shopping cart.

After the delivery of the items is completed, the driver can input the delivery completion status information into the fulfillment platform through the delivery of the items. Once delivery is complete, the service can be evaluated and move on to a new job.

The fulfillment platform can specify the entire route, including the delivery vehicle route, and can recommend a waiting or roaming location for the vehicle. In addition, the fulfillment platform can order additional delivery tasks to a waiting or roaming vehicle. In addition, the fulfillment platform may allow order reception, picking, and packing to be performed on waiting or roaming vehicles and may allow stock exchange and matching information between vehicles to be shared. In addition, when an additional delivery task command is input during delivery, an order is additionally received in real time, and the corresponding additional operation is possible in a vehicle outside the logistics center.

In addition, the fulfillment platform may be implemented with one or more microprocessors operating according to a set program, and the set program may perform driver management, vehicle control and dispatch control, tracking and route search, item inventory management for each vehicle, and data management of the mobile fulfillment system according to an embodiment of the present disclosure.

The fulfillment platform may be connected to the control system to monitor the performance status of the fulfillment system through the control system. In addition, inventory updates and operational requests from the control system can be transmitted to the fulfillment platform. The control system may be implemented with one or more microprocessors operating according to a set program.

The control system may guide the time and location at which the selected vehicle should arrive at the orderer. Delivery schedule information is constantly updated, and the updated information may be delivered to the fulfillment platform.

The control system monitors the delivery performance status of the fulfillment system in real time and may include a status board for controlling vehicle and driver information. On the status board, when a delivery reservation is received, a notification may appear, and user information, requested service, and requested affiliate contents may be expressed. Also, on the status board, an order approval notification may be displayed after checking stock for each vehicle and delivery possibility within time, and the vehicle status may be changed to 'in operation' after a suitable vehicle is assigned. In addition, the delivery route guided to the driver is expressed on the status board, and an estimated arrival time may be displayed. In addition, on the status board, a notification may be displayed after the expression of the picking item and the completion of packaging.

The mobile fulfillment center may include a plurality of vehicles dispatched from the fulfillment platform and may directly deliver items to customers and monitor delivery status according to customer information and order data.

The mobile fulfillment center transfers order data from the fulfillment platform to the dispatched vehicle.

In this case, a vehicle such as a delivery truck or a light truck, or an EV truck may be used as the plurality of vehicles.

In addition, a plurality of vehicles may be a low-floor combined refrigeration box vehicle.

In a plurality of vehicles of the mobile fulfillment center, the driver receives a shipping request from the fulfillment platform through an application. The driver responds to the fulfillment platform through the application to the shipping request. After delivery, the driver delivers the delivery confirmation information to the fulfillment platform. Vehicle dispatch data from the mobile fulfillment center is transmitted to the vehicle control platform. The vehicle control platform transmits vehicle dispatch data to the fulfillment platform.

Referring to FIG. 3, a customer orders an item through the application, selects a real-time delivery option, and places an order for the desired items.

The information entered by the customer is transmitted to the fulfillment platform, and the vehicle is dispatched after confirming the order and payment.

The dispatched vehicle receives the order information.

A vehicle, i.e., a mobile fulfillment center, applies an automatic sorting system in the on-board vehicle in order to eliminate the labor of a driver directly picking an item.

It is linked with the management platform and delivered to the vehicle when the order is confirmed.

The items ordered by the customer are gathered in the shopping cart by the automatic picking function while moving to the delivery destination. The driver can check the gathered items and deliver them directly to the customer, shortening the picking and packing time.

After that, the driver puts the ordered items and delivers them to the customer.

By performing automatic sorting and automatic packing while moving in the vehicle, the mobile fulfillment center can reduce the time by automatically performing tasks (order processing, item classification) performed in the existing logistics center in the vehicle. The mobile fulfillment center sends order information to an automatic sorting system equipped with an LTE communication module to extract ordered items. The extracted items are automatically collected in a reusable delivery cart installed in the vehicle and can be picked up and delivered by the delivery driver upon arrival at the destination.

Meanwhile, at the same time as the item is extracted, the packing details and QR code are displayed on the PC screen or small label printer linked with the sorting system. And, if the driver recognizes the QR code marked on the packing details with the app after arriving at the destination, it is possible to verify whether the order details stored in the fulfillment platform matches the extracted item list.

FIG. 4A-FIG. 4I are views illustrating a rail-type, rollable container system for loading and unloading convenience in a movable fulfillment system according to an embodiment of the present disclosure.

Referring to FIG. 4A-FIG. 4I, as a rail-type, rollable container system for loading and unloading convenience, it can be used for storage inside a store, and a purpose built vehicle (PBV) uses a movable shelf with wheels for loading and unloading convenience.

In this case, loading and unloading of individual items is not required, preparation can be made before loading and unloading, and the time between loading and unloading can be minimized.

Figure 4A:
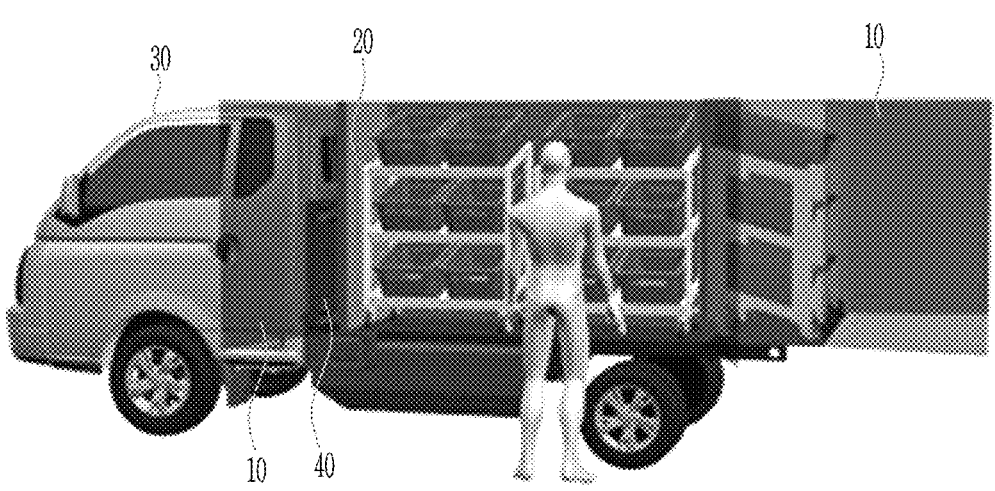
FIG. 4A-FIG. 4I are views illustrating a rail-type, rollable container system for loading and unloading convenience in a movable fulfillment system according to an embodiment of the present disclosure.
Figure 4B:
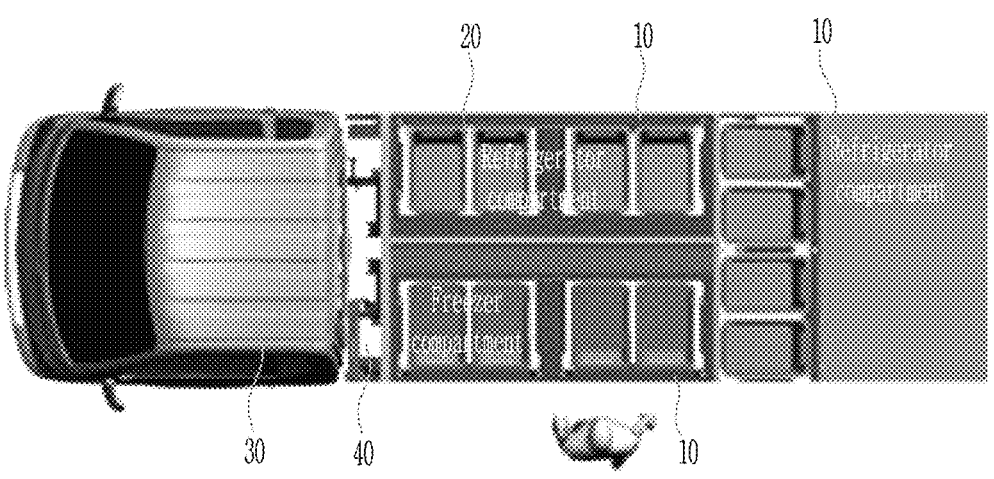

As shown in FIG. 4A and FIG. 4B, as a low-floor vehicle-based refrigerator and freezer vehicle, there are three double-door swing doors 10 (side freezer compartment and refrigerator compartment, rear refrigerator compartment), and six 3-stage movable roll containers 20 are loaded.

In addition, the hand cart 40 can be stored in the space between the driver's seat cab 30 and the storage compartments on both sides.

In other words, the vehicle may be provided with double-door swing doors 10 on both sides and the rear, respectively, and six three-stage roll containers 20 may be provided in the storage compartments on both sides and the rear side.

The storage compartments on both sides may be provided as a freezer compartment and a refrigerator compartment, respectively, and the storage compartments on the rear side may be provided as a refrigerator compartment.

Figure 4C:
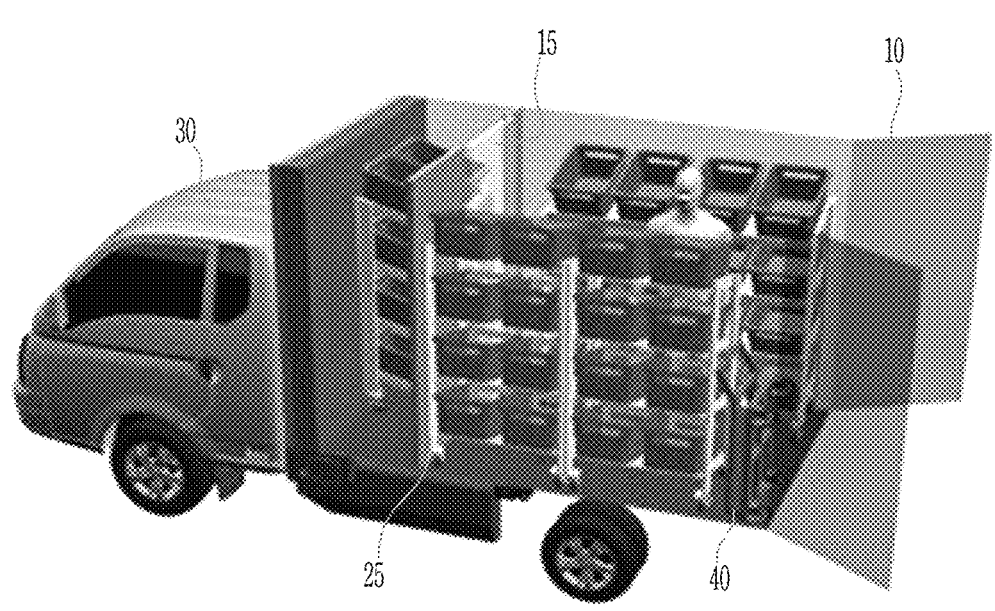
Figure 4D:
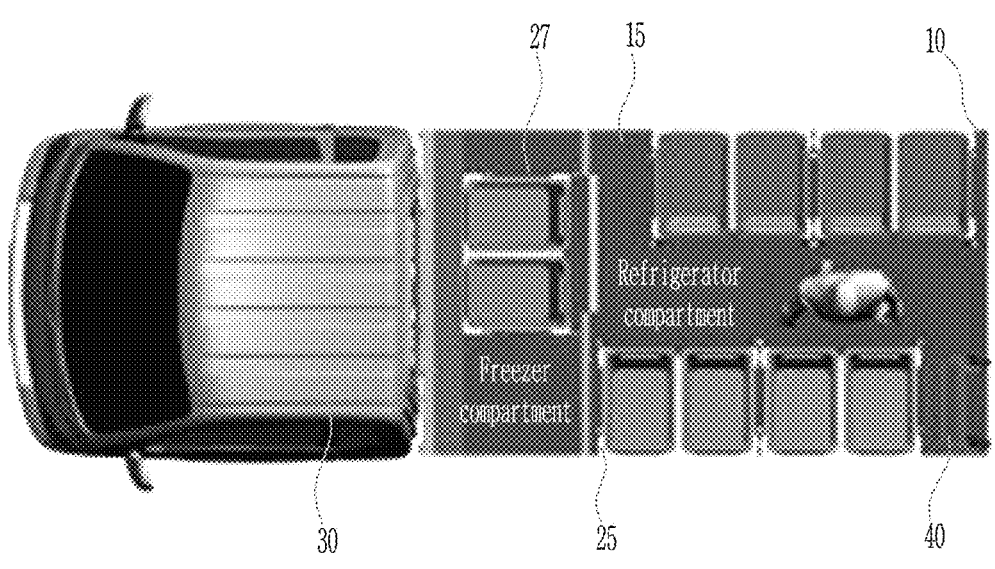

In addition, as shown in FIG. 4C and FIG. 4D, as a high-floor vehicle-based refrigerator and freezer vehicle, there are one double-door swing door 10 on the rear side and one cold storage swing door 15 on the passenger side.

In addition, five 4-stage movable roll containers 25 are loaded, and a hand cart 40 can be stored inside the rear door 10 of the refrigerator compartment.

In other words, a double-door swing door 10 may be provided on the rear side of the vehicle, and a short door type swing door 15 may be provided on the rear side of the passenger seat.

In addition, four 4-stage roll containers 25 may be provided on the storage compartment, and one roll container 27 may be provided on the rear space of the passenger seat side.

The storage compartment may be provided as a refrigerator compartment, and the space behind the passenger seat may be provided as a freezer compartment.

Figure 4E:
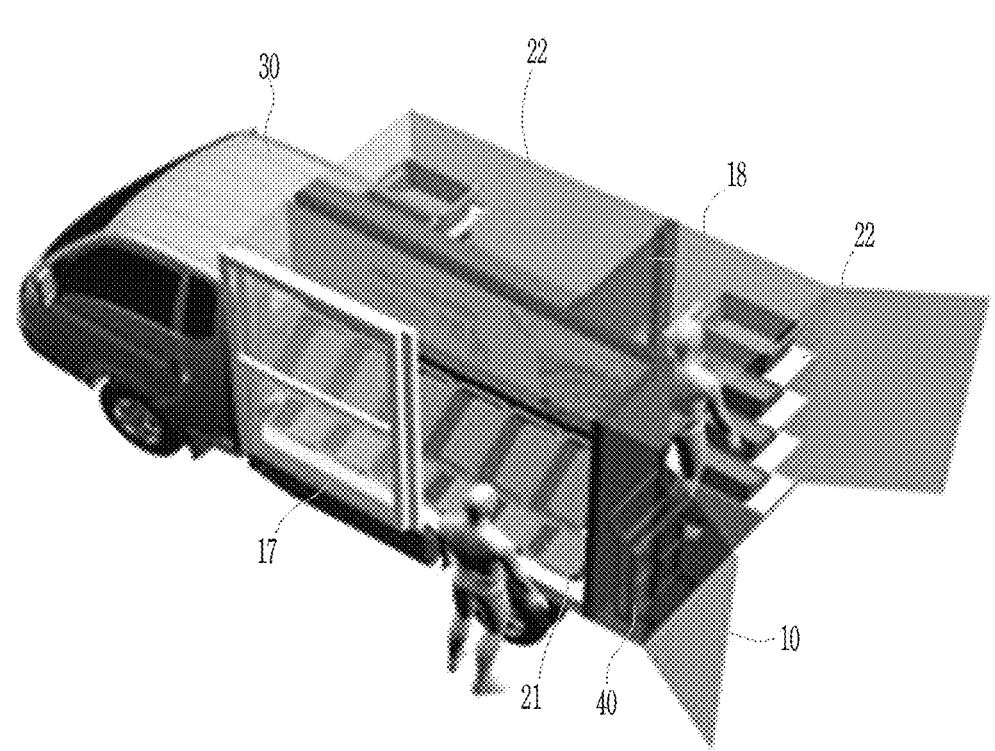
Figure 4F:
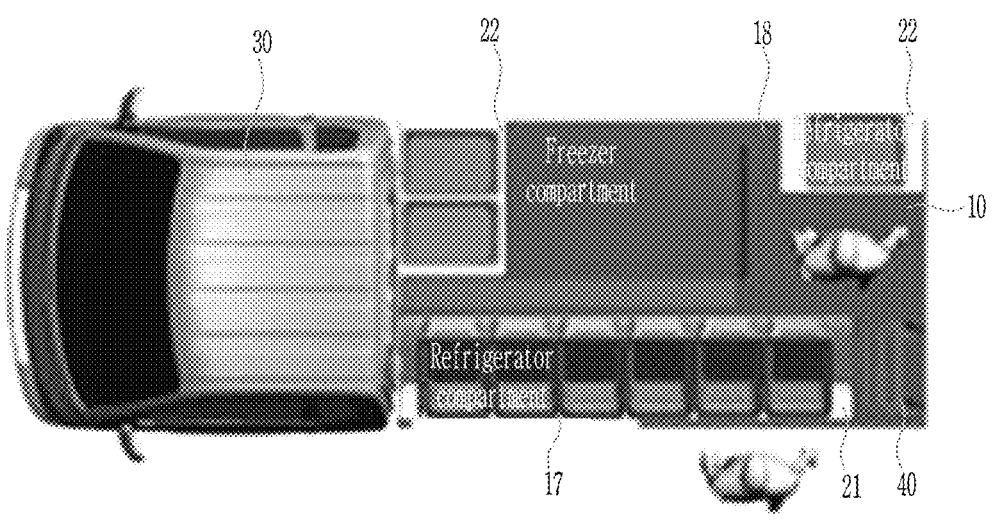

In addition, as shown in FIG. 4E and FIG. 4F, as a high-floor vehicle-based refrigerator and freezer vehicle, there are one transparent window sliding door 17, one double-door swing door 10 on the rear side, and one cold storage rolling door 18.

The transparent window sliding door 17 can promote items, shippers, and vehicles by utilizing display and lighting.

In addition, a two-stage first shelf 21 and a four-stage second shelf 22 may be installed, and a hand cart 40 may be stored inside the rear door of the refrigerator compartment.

In other words, the vehicle may be provided with a transparent window sliding door 17 on one side, a double-door type swing door 10 on the rear side, and a rolling door 18 on the inside of the storage compartment.

In addition, a two-stage first shelf 21 may be provided on one side of the storage compartment, and a four-stage second shelf 22 may be provided in the rear space of the storage compartment and the passenger seat side.

The storage compartments on one side and the rear side of the vehicle may be provided as refrigerator compartments, and the rear space on the passenger side may be provided as a freezer compartment.

Figure 4G:
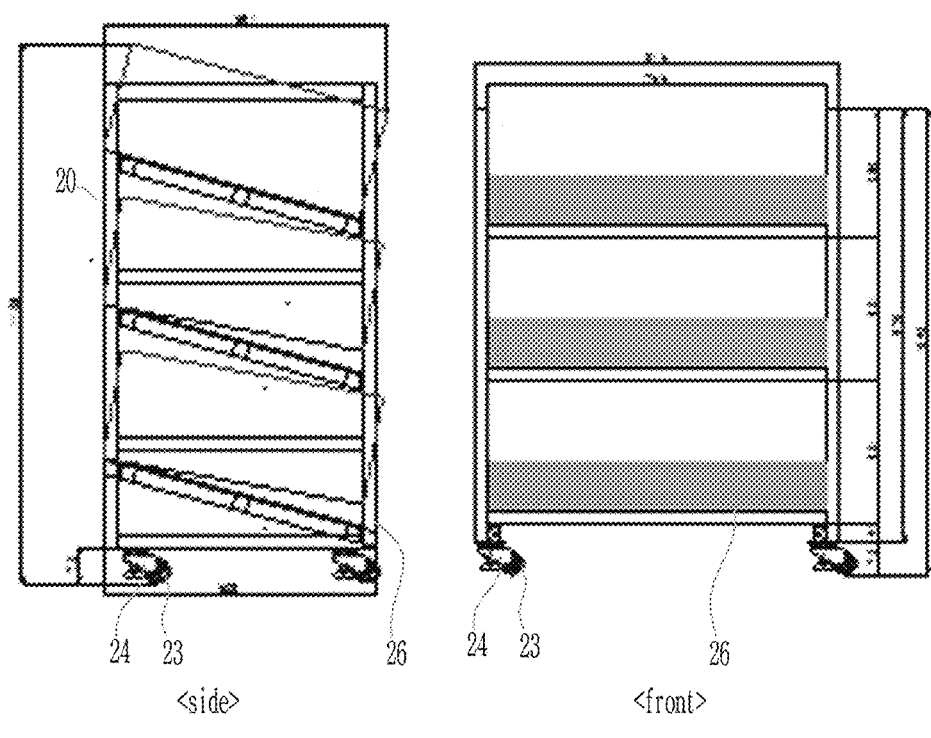

In addition, as shown in FIG. 4G, as a mobile fulfillment item loading and unloading means, it can be additionally used for loading and displaying items at the shipper's offline store and warehouse.

The roll container 20 is fixed by combining the lower part of the roll container wheel 23 and the locking device 24, and a protrusion 26 is added to the front of each stage of the roll container 20 to supplement the box so that the box does not come off during movement.

In addition, a tilting function in which an inclination is given to each end of the roll retainer 20 may be added to be advantageous when picking an item, so that each end of the roll retainer 20 is inclined when picking an item.

Figure 4H:
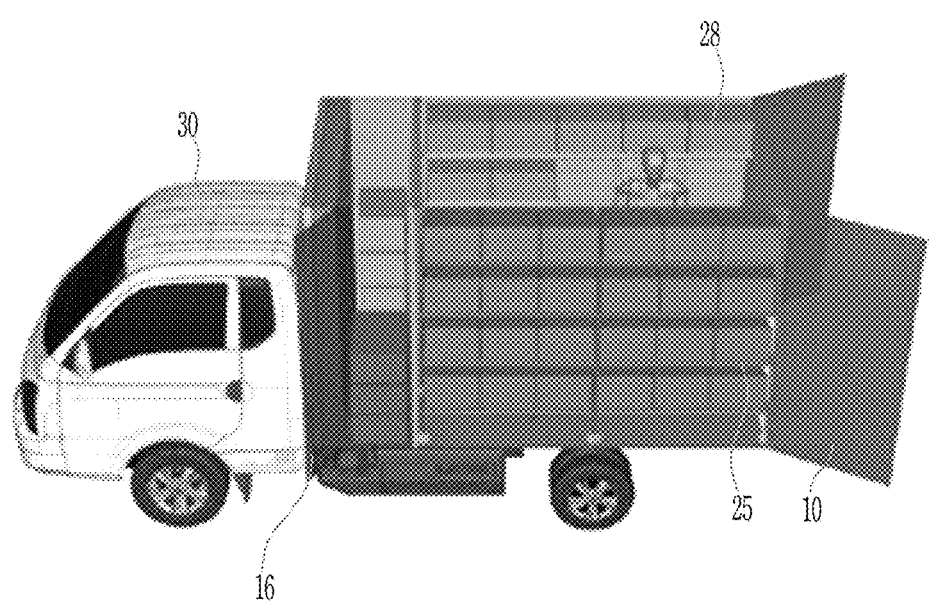
Figure 4I:
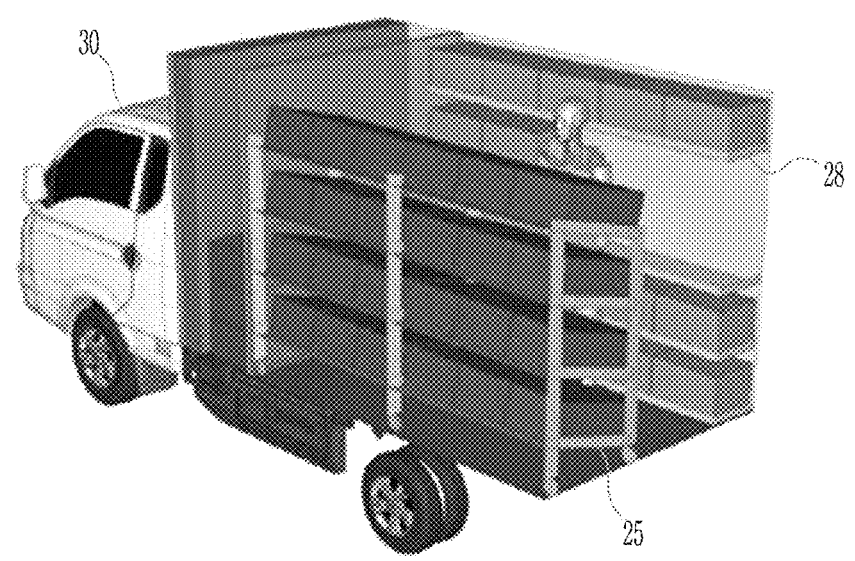

As shown in FIG. 4H and FIG. 4I, the high-floor vehicle-based vehicle has a double-door swing door 10 on the rear of the vehicle, and a short-door swing door 16 may be installed between the passenger seat and the storage compartment.

Two 4-stage movable roll containers 25 are loaded on one side of the storage compartment, and a 5-stage shelf 28 may be installed on the opposite side. The 5-stage shelf 28 may be used as a shelf for packaging a box for immediate delivery. Items can also be loaded in the space between the passenger seat and the storage compartment.

Figure 5:
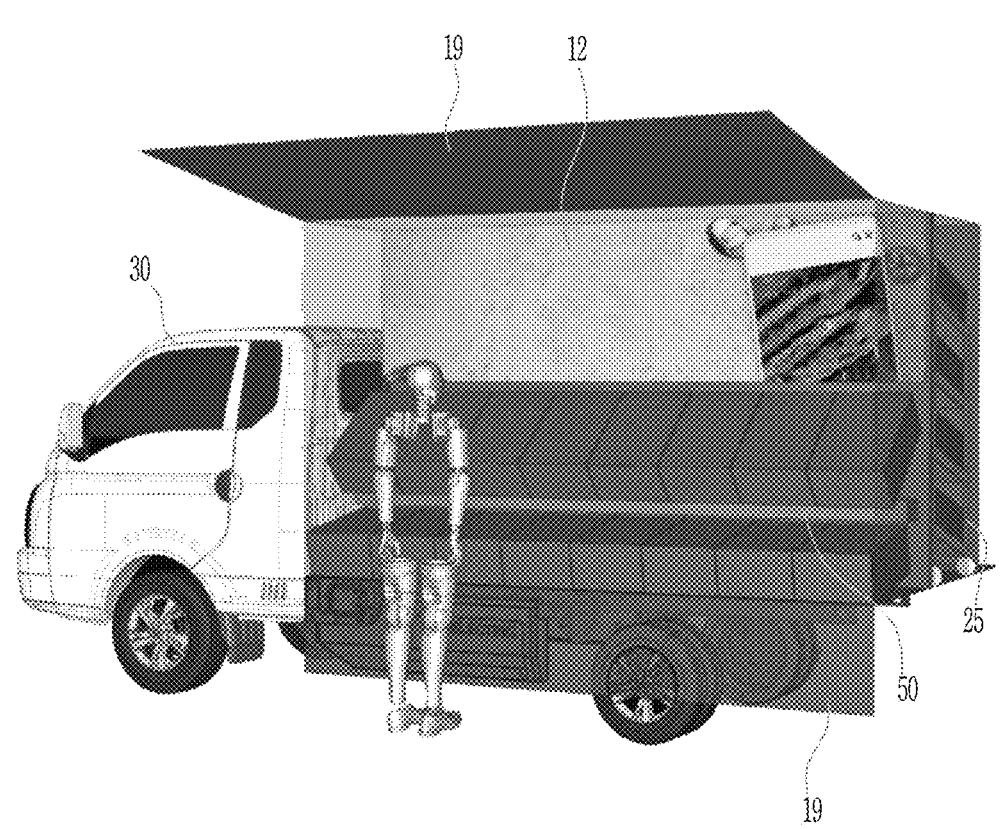
FIG. 5 is a view showing a state of a vehicle serving as a mobile shop in the mobile fulfillment system according to an embodiment of the present disclosure.

FIG. 5 is a view showing a state of a vehicle serving as a mobile shop in the mobile fulfillment system according to an embodiment of the present disclosure.

Referring to FIG. 5, as a display of fresh items using lighting and transparent windows, it plays a role of a mobile store, and as a display of fresh items delivery, the vehicle can be used as a promotional tool to emphasize the freshness of the item.

In addition, a form in which an item to be sold can be directly selected is possible in a stopped vehicle, and a form of a mobile shop is also possible.

As shown in FIG. 5, a transparent wing door 19 that swings open and close at the upper and lower portions of one side of the vehicle may be provided. When the transparent wing door 19 is opened, the advertisement display 12 and the item inside the storage compartment can be seen from the outside. In addition, when the opening of the transparent wing door 19 is sensed, the power of the advertisement display 12 may be turned on and connected to the platform management device to be shown.

In addition, the cold air system 50 is provided in the storage compartment, so that the item can be cooled.

In addition, the four-stage movable roll container 25 may be additionally loaded on the other side of the vehicle.

Meanwhile, according to an embodiment of the present disclosure, through dynamic routing, optimal routing is provided in real time according to the operation, driver, and inventory status of the delivery vehicle. Thus, delivery efficiency may be maximized.

In addition, order information can be transferred from the fulfillment platform (management system) to the vehicle, and order sorting and picking can be performed automatically while moving to a delivery destination.

In addition, the inventory status can be reflected after recognizing the items loaded automatically through item identification tags (bar codes, QR codes) in the inventory tray for each vehicle, and no individual input is required.

In addition, when the quantity of items is insufficient, it is possible to implement a cooperative scenario between operating fleets, such as exchange of intermediate points between vehicles and distribution of items. The fulfillment platform (management system) checks whether the dispatched vehicle has the stock ordered, and when it is confirmed that the stock is insufficient, searches for a nearby stocked vehicle. When a vehicle with stock in the vicinity is found, an order to hand over the items is issued to the stocked vehicle. And, by identifying the movement lines of the non-stock vehicle and the stock-holding vehicle, the intermediate point is determined. It then guides a new route for the non-stock vehicle and the stock-holding vehicle to move to the intermediate point.

In addition, based on the existing order history, it is possible to identify predicted items, demand, and time zone for each region and reflect it in the mobile fulfillment inventory to be shipped out on the same day.

Figure 6:
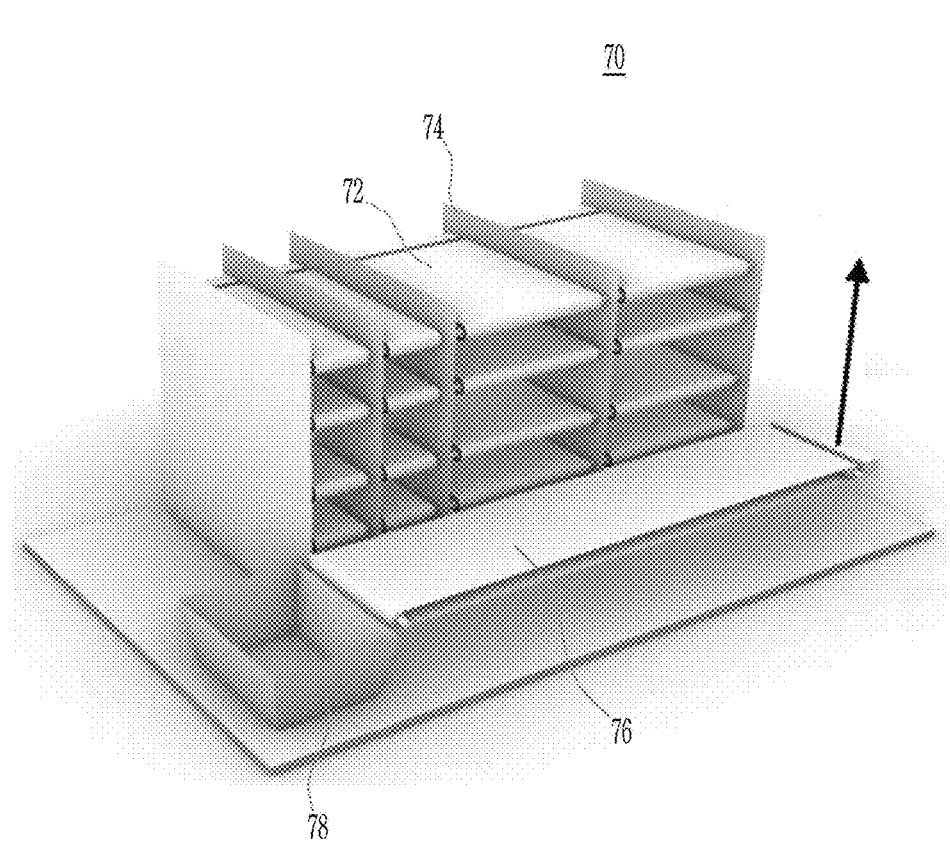
FIG. 6 is a view showing an automatic sorting and picking apparatus using a conveyor belt provided in a refrigerator/freezer vehicle based on a high-floor vehicle in a mobile fulfillment system according to an embodiment of the present disclosure.

FIG. 6 is a view showing an automatic sorting and picking apparatus using a conveyor belt provided in a refrigerator/freezer vehicle based on a high-floor vehicle in a mobile fulfillment system according to an embodiment of the present disclosure.

Referring to FIG. 6, refrigerated fresh food is automatically sorted and picked up while the vehicle is moving with a bending machine, and the opposite side space can be used as a space for frozen food in the cold storage room.

The automatic sorting and picking apparatus 70 consists of a plurality of layers of a plurality of sorting conveyor belts 72, and an item is mounted on each sorting conveyor belt 72. Each sorting conveyor belt 72 may be actuated by a separate motor to slide and move items on the sorting conveyor belt 72 forward.

Each of the sorting conveyor belts 72 is partitioned by item separation membranes 74, and thus the area of each sorting conveyor belt 72 is different. The item may be mounted on the sorting conveyor belt 72 having an area corresponding to the size of the item.

A picking conveyor belt 76 for picking an item may be disposed in front of the sorting conveyor belts 72 on which the item is mounted. In addition, a reusable shopping cart 78 containing items may be disposed on the end side of the picking conveyor belt 76. In addition, the picking conveyor belt 76 may be installed to be movable in the vertical direction by an elevator device.

As in using a vending machine, when a specific item is selected from among sorted items, the sorting conveyor 72 on which the item is mounted is operated to move the item forward and transferred onto the picking conveyor 76, the picking conveyor 76 operates, and the item is put into the shopping cart. The picking conveyor 76 is raised to the height of the corresponding sorting conveyor 72 by the elevator device.

Figure 7A:
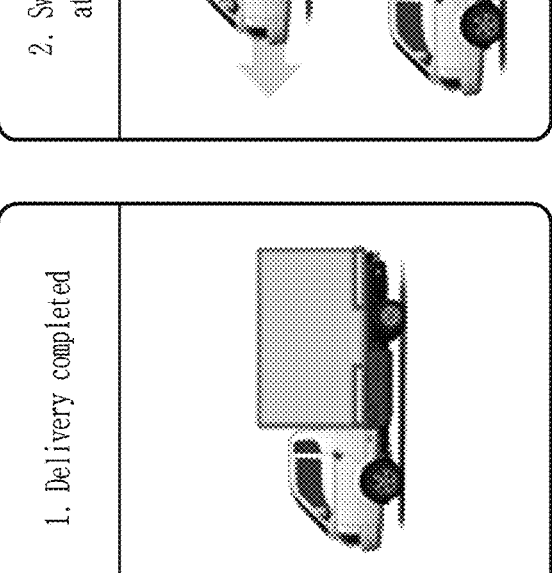
FIG. 7A is a view showing a state of the vehicle replacing a swap body in the logistics center of the mobile fulfillment center according to an embodiment of the present disclosure.
Figure 7B:
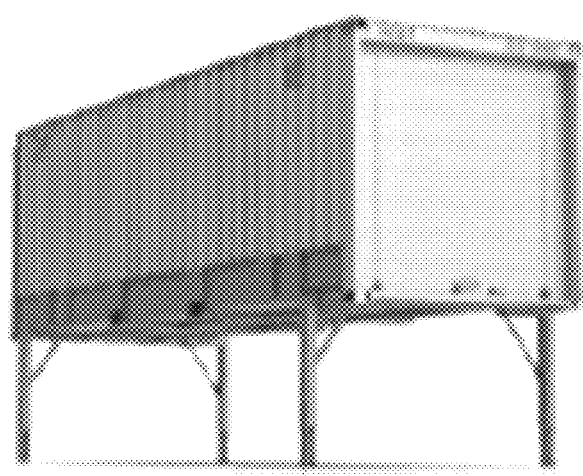
FIG. 7B is a view showing the swap body of a vehicle according to an embodiment of the present disclosure.

FIG. 7A is a view showing a state of the vehicle replacing a swap body in the logistics center of the mobile fulfillment center according to an embodiment of the present disclosure, and FIG. 7B is a view showing the swap body of a vehicle according to an embodiment of the present disclosure.

Referring to FIG. 7A and FIG. 7B, the dispatched vehicle of the mobile fulfillment center may be a delivery truck including a swap body. The swap body is a kind of container box, in which items to be delivered may be loaded. A plurality of legs supported on the ground may be installed in the swap body.

After the delivery of the items is completed, the swap body, which is empty inside, is replaced with a new swap body loaded with the items to be delivered at the logistics center (base center), loaded onto the vehicle, and delivered. Accordingly, it is possible to minimize the loading time and maximize the use time of the delivery vehicle. Meanwhile, the swap body is made of various shapes and types and can be changed at any time to suit the purpose of the PBV (Purpose built vehicle). The vehicle can be operated as a normal truck in normal times, and when used as a delivery vehicle for a mobile fulfillment center, a swap body can be applied to use it as a logistics truck.

As described above, by improving the principle of the existing vending machine, it can be used as an automatic sorting system.

In addition, by manufacturing customizable conveyor belts in a modular type, it is possible to change each size (small, medium, large), so that it is easy to respond when modifying the delivery product.

In addition, it can be delivered to a shopping cart by using an elevator-type conveyor belt that moves up and down.

As a mobile sorting system, in consideration of the vibration, a sealant can be used instead of a screw.

Like this, according to an embodiment of the present disclosure, by building a mobile fulfillment center using a vehicle such as a delivery truck or a light truck from an existing fixed-scale logistics center and by implementing an immediate delivery service within a limited delivery radius, moving, picking, and packing are handled in-vehicle at the same time as ordering. Thus, the delivery time may be shortened.

In addition, it is possible to provide a service that preloads major products in the vehicle, and when a customer places an order, orders are processed through the control platform and delivered immediately through vehicle dispatch.

In addition, order and inventory management, sorting, loading and unloading, packaging, and delivery, which were carried out in the existing logistics center, can be carried out in individual units in a vehicle such as a delivery truck or a light truck on a small scale.

While this disclosure has been described in connection with what is presently considered to be practical embodiments, it should be understood that the disclosure is not limited to the disclosed embodiments. On the contrary, it is intended to cover various modifications and equivalent arrangements included within the spirit and scope of the appended claims.

What is claimed is:

1. A mobile fulfillment system, comprising:
   a shipper system that collects and manages customer information and order data input from customers;
   a fulfillment platform that receives the customer information and order data from the shipper system and controls vehicle control and dispatch accordingly; and a mobile fulfillment center that includes a plurality of vehicles dispatched from the fulfillment platform and delivers products to customers and monitors delivery status according to the customer information and order data, wherein the plurality of vehicles performs automatic sorting and automatic picking inside while moving to a delivery destination by using the order data transmitted from the fulfillment platform, wherein a plurality of roll containers is provided inside the plurality of vehicles, and each stage of the roll containers is formed of a conveyor belt, wherein at a front end of the conveyor belt of each stage of the roll containers, a picking conveyor belt of which a vertical height is adjusted and disposed in a direction perpendicular to the conveyor belt of each stage of the roll containers is provided, wherein each of the conveyor belts is partitioned by item separation membranes, wherein a reusable shopping cart containing items is disposed on an end side of the picking conveyor belt, and wherein a direction in which the items move on the picking conveyor belt is perpendicular to a direction in which the items move on the conveyor belt of each stage of the roll containers.

2. The mobile fulfillment system of claim 1, wherein:

the shipper system receives the customer information and order data input through an application (app) and transmits the order data and payment information to the fulfillment platform.

3. The mobile fulfillment system of claim 1, wherein:

the fulfillment platform performs vehicle dispatch after checking the order data and payment information and performs inventory management for each dispatched vehicle.

4. The mobile fulfillment system of claim 1, wherein:

the mobile fulfillment center transfers the order data transmitted from the fulfillment platform to the dispatched vehicle.

5. The mobile fulfillment system of claim 1, wherein:

the plurality of vehicles includes a low-floor combined refrigeration box vehicle.

6. The mobile fulfillment system of claim 1, wherein:

the plurality of vehicles is provided with double-door swing doors on both sides and rear sides, respectively.

7. The mobile fulfillment system of claim 6, wherein:

the plurality of vehicles are provided with a plurality of three-stage roll containers, respectively, in item storage compartments on both sides and the rear side.

8. The mobile fulfillment system of claim 7, wherein:

the roll container is provided with a wheel and a wheel fixing device at the lower end.

9. The mobile fulfillment system of claim 8, wherein:

a protrusion is provided at an edge of a front end of each end of the roll container, and an inclination of each end of the roll container is adjusted.

10. The mobile fulfillment system of claim 7, wherein:

in the plurality of vehicles, the item storage compartments on both sides are provided as a freezer compartment and a refrigerator compartment, respectively, and the item storage compartments on the rear side are provided as a refrigerator compartment.

\* \* \* \* \*